US012671788B2

(12) United States Patent
Wu et al.

(10) Patent No.: US 12,671,788 B2
(45) Date of Patent: Jun. 30, 2026

(54) VIDEO CONFERENCE SYSTEM

(71) Applicant: BenQ Corporation, Taipei City (TW)

(72) Inventors: Chen-Chi Wu, Taipei City (TW);
Chin-Fu Chiang, Taipei City (TW);
Chia-Nan Shih, Taipei City (TW);
Cheng-Pu Lin, Taipei City (TW);
Jung-Kun Tseng, Taipei City (TW);
Chuang-Wei Wu, Taipei City (TW)

(73) Assignee: BenQ Corporation, Taipei City (TW)

( * ) Notice: Subject to any disclaimer, the term of this patent is extended or adjusted under 35 U.S.C. 154(b) by 477 days.

(21) Appl. No.: 18/164,848

(22) Filed: Feb. 6, 2023

(65) Prior Publication Data

US 2023/0254444 A1    Aug. 10, 2023

(30) Foreign Application Priority Data

Feb. 7, 2022    (TW) .................................. 111104402

(51) Int. Cl.
*H04N 7/14*          (2006.01)
*H04N 7/15*          (2006.01)
(52) U.S. Cl.
CPC ............. *H04N 7/142* (2013.01); *H04N 7/147* (2013.01); *H04N 7/15* (2013.01)
(58) Field of Classification Search
CPC .......... H04N 7/142; H04N 7/147; H04N 7/15; H04S 3/008; H04S 7/30; H04R 3/001; H04R 5/021; H04R 2420/07
See application file for complete search history.

(56) References Cited

U.S. PATENT DOCUMENTS

| | | | | |
|---|---|---|---|---|
| 7,116,349 B1* | 10/2006 | Yang | ...................... | H04N 7/141 |
| | | | | 348/14.02 |
| 8,451,994 B2* | 5/2013 | Abuan | ................... | H04N 7/141 |
| | | | | 379/102.01 |
| 9,661,264 B2* | 5/2017 | Tamiya | .................. | H04N 23/64 |
| 2006/0063562 A1* | 3/2006 | Hirai | ...................... | H04N 7/142 |
| | | | | 348/E7.079 |
| 2010/0017645 A1* | 1/2010 | Kimoto | .................. | H04N 7/183 |
| | | | | 714/4.1 |
| 2012/0314018 A1* | 12/2012 | Wengrovitz | ........... | H04N 7/181 |
| | | | | 348/E7.083 |
| 2014/0018053 A1* | 1/2014 | Cho | ...................... | H04M 1/724 |
| | | | | 455/418 |

(Continued)

FOREIGN PATENT DOCUMENTS

| | | |
|---|---|---|
| CN | 101729828 A | 6/2010 |
| TW | 201143348 A1 | 12/2011 |

*Primary Examiner* — Duc Nguyen
(74) *Attorney, Agent, or Firm* — MUNCY, GEISSLER, OLDS & LOWE, P.C.

(57)          ABSTRACT

A video conference system is disclosed. The video conference system includes at least one transmitter device and a receiver device. The transmitter device is connected to an information processing device. The receiver device and the transmitter device are wirelessly connected. The receiver device wirelessly receives a video data related to the information processing device transmitted by the transmitter device. When the receiver device triggers a standby screen and the receiver device is connected to a video conference screen management device, the receiver device does not output the standby screen to the video conference screen management device.

13 Claims, 3 Drawing Sheets

(56)          References Cited

U.S. PATENT DOCUMENTS

| | | | |
|---|---|---|---|
| 2016/0110152 A1* | 4/2016 | Choi | G06F 3/04817 |
| | | | 345/2.3 |
| 2016/0249014 A1* | 8/2016 | Orime | H04N 7/142 |
| 2016/0253142 A1* | 9/2016 | Choi | G06F 3/1423 |
| | | | 345/1.3 |
| 2017/0034477 A1* | 2/2017 | Morita | H04N 7/15 |
| 2017/0109119 A1* | 4/2017 | Park | G09G 5/14 |
| 2017/0310929 A1* | 10/2017 | Inoue | H04M 11/00 |
| 2020/0389622 A1* | 12/2020 | Chiang | G06F 9/4413 |
| 2021/0160355 A1* | 5/2021 | Min | G06F 3/04883 |
| 2021/0203876 A1* | 7/2021 | You | H04N 7/08 |
| 2021/0211603 A1* | 7/2021 | Shih | G06F 3/1462 |
| 2022/0311632 A1* | 9/2022 | Daga | H04L 12/1818 |
| 2023/0208894 A1* | 6/2023 | Litsuka | H04N 7/152 |
| | | | 709/204 |
| 2024/0422210 A1* | 12/2024 | Zhao | H04W 12/71 |

* cited by examiner

VIDEO CONFERENCE SYSTEM

BACKGROUND OF THE INVENTION

1. Field of the Invention

The invention relates to video conference; in particular, to a video conference system.

2. Description of the Prior Art

In recent years, with the rapid development of the internet and video processing, multiple users in different places can carry out synchronous connection of video through electronic devices such as computers, smart phones, tablet computers, etc., so that when the users make voice calls, they can also see the dynamic images of other users through the monitor to enhance the sense of reality and presence in the communication. Therefore, a video conference with both image and voice transmission has gradually replaced a conference call with only voice transmission as a commonly used and efficient communication way.

In general, a transmitter device (TX) and a receiver device (RX) in a video conference system are wirelessly connected. The transmitter device can be connected to an information processing device and the receiver device can be connected to the video conference screen management device. In the scenario of conventional video conference, when the transmitter device stops screen sharing, the receiver device is in a standby mode and continues to output a standby screen to the video conference screen management device, and the video conference screen management device continues to transmit the standby screen to the display, so that a part of the video conference system screen displayed on the display is occupied by the standby screen, for example, a part of the video conference system screen 1 is occupied by the standby screen SB in FIG. 1, which needs to be further improved.

SUMMARY OF THE INVENTION

Therefore, the invention provides a video conference system to solve the above-mentioned problems of the prior arts.

A preferred embodiment of the invention is a video conference system. In this embodiment, the video conference system includes at least one transmitter device and a receiver device. The transmitter device is connected to an information processing device. The receiver device and the transmitter device are wirelessly connected. The receiver device wirelessly receives a video data related to the information processing device transmitted by the transmitter device. When the receiver device triggers a standby screen and the receiver device is connected to a video conference screen management device, the receiver device does not output the standby screen to the video conference screen management device.

In an embodiment, a physical button is disposed on the transmitter device, the physical button is triggered to wirelessly transmit a real-time screen of the information processing device to the receiver device, and then the receiver device transmits the real-time screen to the video conference screen management device; when the physical button is triggered to stop screen sharing of the transmitter device, the receiver device generates a standby screen.

In an embodiment, when the transmitter device is not connected to the receiver device, the receiver device outputs the standby screen as a connection operation scenario. If the receiver device is connected to the video conference screen management device, the receiver device does not output the standby screen to the video conference screen management device.

In an embodiment, the receiver device includes a first port, and the first port is connected to the video conference screen management device through a first channel. The receiver device does not output the standby screen to the video conference screen management device by setting the first port, so that the first channel does not output or close.

In an embodiment, the receiver device includes an image processing unit coupled to the first port. The image processing unit does not output the standby screen to the first port.

In an embodiment, whether the receiver device is connected to the video conference screen management device is determined through an exchange of extended display identification data (EDID) between the receiver device and the video conference screen management device.

In an embodiment, whether the receiver device is connected to the video conference screen management device is determined through a loopback of universal serial bus (USB) control signal or high-definition multimedia interface (HDMI) consumer electronics control (CEC) signal.

In an embodiment, when the transmitter device does not trigger the screen sharing function or interrupts the connection between the transmitter device and the receiver device and does not wirelessly transmit the screen of the connected information processing device to the receiver device, the receiver device triggers the standby screen.

In an embodiment, when the receiver device triggers the standby screen and the receiver device is connected to a first display, the receiver device outputs the standby screen to the first display.

In an embodiment, the receiver device has a second port, the second port is connected to the first display through a second channel, the first display receives the standby screen, but the video conference screen management device does not receive the standby screen.

In an embodiment, the video conference screen management device is also connected to the second display, when the video conference screen management device receives a plurality of video conference screens, the video conference screen management device distributes the plurality of video conference screens to be displayed on different display areas of the second display respectively, and the plurality of video conference screens does not include the standby screen transmitted from the receiver device.

In an embodiment, the video conference screen management device is connected to the second display through a third channel, and the third channel is a HDMI channel.

In an embodiment, the video conference screen management device is also connected to a camera, and the camera obtains a video conference screen and provides the video conference screen to the video conference screen management device.

Compared to the prior art, when the video conference system of the invention operates in the scenario of video conference, once the transmitter device stops screen sharing and the receiver device is in the standby state, the receiver device does not output a standby screen to the video conference screen management device and the video conference screen management device cannot display the standby screen on the video conference system screen of the display, so the problem that the standby screen occupies a part of the video conference system screen in the prior art can be effectively solved.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a video conference system. In practical applications, the video conference system can be applied to various types of video conference scenarios, allowing multiple users in different places to simultaneously conduct video conference with video and audio transmission through electronic devices such as computers, smart phones, and tablet computers. And, the standby screen triggered by the receiver device will not appear in the video conference system screen seen by all users, but not limited to this.

Figure 1:
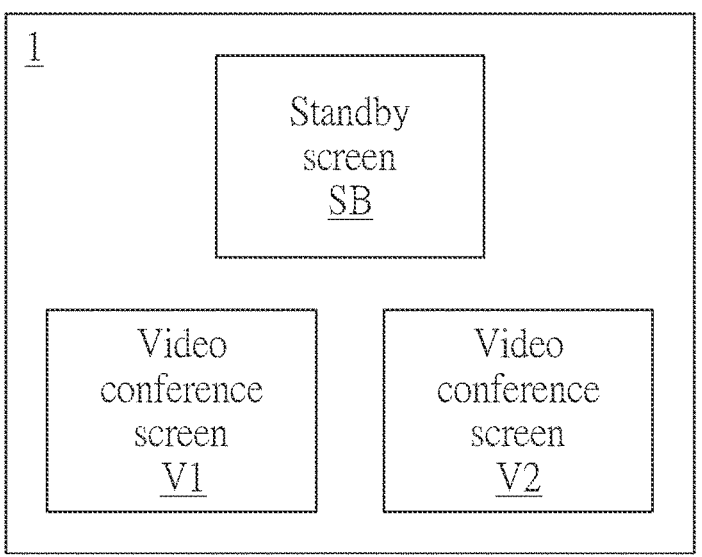
FIG. 1 illustrates a schematic diagram that a part of a video conference system screen is occupied by a standby screen in the prior art.
Figure 2:
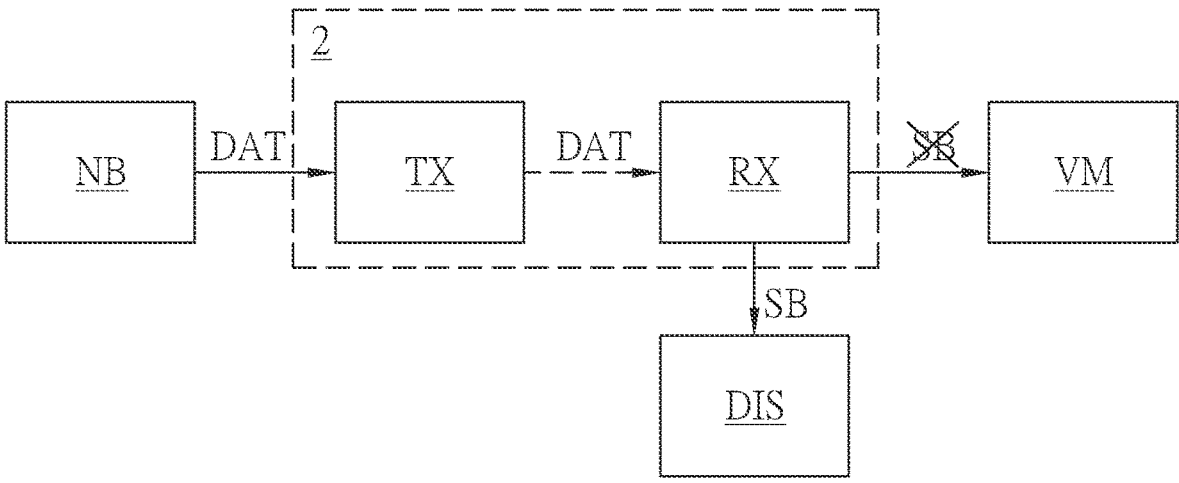
FIG. 2 illustrates a schematic diagram of a video conference system in a preferred embodiment of the invention.

Please refer to FIG. 2. FIG. 2 illustrates a schematic diagram of the video conference system in this embodiment. As shown in FIG. 2, the video conference system 2 includes a transmitter device TX and a receiver device RX. The transmitter device TX is connected to the information processing device NB. The receiver device RX is wirelessly connected with the transmitter device TX. The receiver device RX wirelessly receives a video and audio data DAT related to the information processing device NB transmitted from the transmitter device TX.

When the receiver device RX triggers a standby screen SB and the receiver device RX is connected to a video conference screen management device VM, the receiver device RX does not output the standby screen SB to the video conference screen management device VM. In addition, when the receiver device RX triggers the standby screen SB and the receiver device RX is connected to a display DIS, the receiver device RX will output the standby screen SB to the display DIS.

It should be noted that when the transmitter device TX does not trigger the screen sharing function or interrupts the connection between the transmitter device TX and the receiver device RX and does not wirelessly transmit the video and audio data DAT of the information processing device NB connected to the transmitter device TX to the receiver device RX, the receiver device RX triggers the standby screen SB. When the transmitter device TX is not connected to the receiver device RX, the receiver device RX outputs the standby screen SB as a connection operation scenario; if the receiver device RX is connected to the video conference screen management device VM, the receiver device RX does not output the standby screen SB to the video conference screen management device VM.

In practical applications, the video conference system 2 can also include a plurality of transmitter devices, and the video conference screen management device VM can be also coupled to devices such as one or more displays and cameras, and the video conference screen management device VM can manage video conference screens it receives to distribute the video conference screens to be displayed on different display areas of the display, and the video conference screens do not include the standby screen SB from the receiver device RX, but not limited to this.

The connection between the transmitter device TX and the information processing device NB can be, for example, a high-definition multimedia interface (HDMI), a universal serial bus (USB) Type-C alternative mode interface, through the exchange of extended display capability identification (EDID) to make the transmitter device TX a virtual display, but not limited to this; in addition, the connection method between the transmitter device TX and the information processing device NB can be a USB interface to load software in the information processing device NB to capture a real-time screen of the information processing device NB and output the real-time screen to the transmitter device TX, but not limited to this.

As to whether the receiver device RX is connected to the video conference screen management device VM, it can be determined through the exchange of EDID between the receiver device RX and the video conference screen management device VM, or a loopback of USB control signal or HDMI consumer electronics control signal between the receiver device RX and the video conference screen management device VM, but not limited to this.

Figure 3:
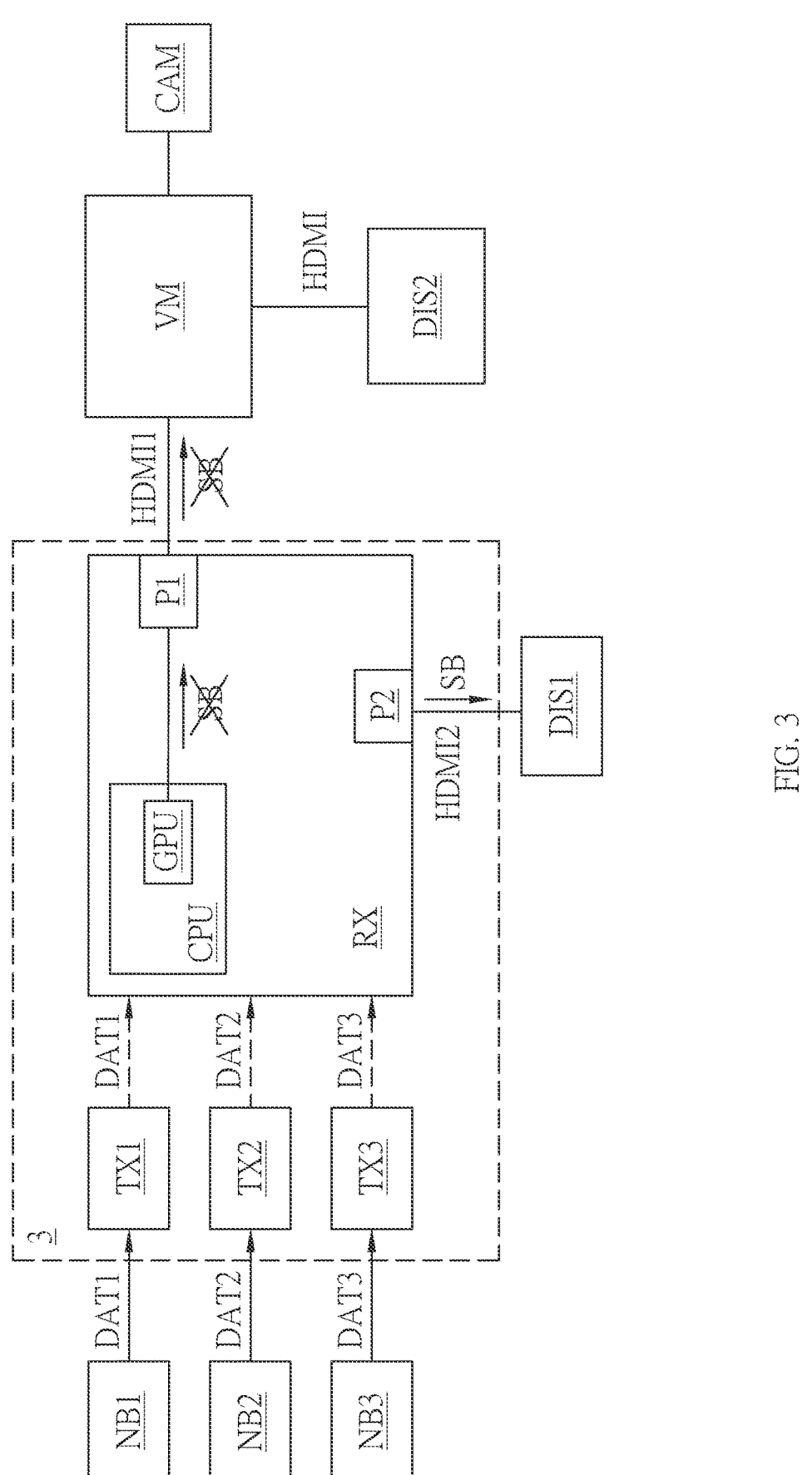
FIG. 3 illustrates a schematic diagram of a video conference system in another preferred embodiment of the invention.

Please refer to FIG. 3. FIG. 3 illustrates a schematic diagram of a video conference system in another embodiment of the invention. As shown in FIG. 3, the video conference system 3 includes a plurality of transmitter devices TX1~TX3 and a receiver device RX. The transmitter devices TX1~TX3 are respectively connected to the information processing devices NB1~NB3. The transmitter devices TX1~TX3 are wirelessly connected to the receiver device RX respectively. The receiver device RX wirelessly receives the video and audio data DAT1~DAT3 from the transmitter devices TX1~TX3 related to the information processing devices NB1~NB3.

When the transmitter devices TX1~TX3 does not trigger the screen sharing function or interrupts the connection between the transmitter devices TX1~TX3 and the receiver device RX and does not wirelessly transmit the audio and video data DAT1~DAT3 of the connected information processing devices NB1~NB3 to the receiver device RX, the receiver device RX will trigger the standby screen SB.

It should be noted that the standby screen SB at this time can be the information on how the transmitter devices TX1~TX3 connect to the receiver device RX, but not limited to this. In practical applications, whether the receiver device RX is connected to the video conference screen management device VM can be determined through the exchange of EDID between the receiver device RX and the video conference screen management device VM or the loopback of USB control signals or HDMI consumer electronics control (CEC) signal, but not limited to this.

When the receiver device RX triggers the standby screen SB and the receiver device RX is connected to the video conference screen management device VM, the receiver device RX does not output the standby screen SB to the video conference screen management device VM. When the transmitter devices TX1~TX3 are not connected to the receiver device RX, the receiver device RX outputs the standby screen SB for the connection operation scenario. If the receiver device RX is connected to the video conference screen management device VM, the receiver device RX does not output the standby screen SB to the video conference screen management device VM.

In practical applications, the receiver device RX can have a first port P1 and the first port P1 can be connected to the video conference screen management device VM through a first channel HDMI1 (such as a HDMI channel). The receiver device RX can set the first port P1 so that the first channel HDMI1 is not output or turned off so as not to output the standby screen SB to the video conference screen management device VM, but not limited to this. The receiver device RX can include an image processing unit GPU, and the image processing unit GPU is coupled to the first port P1 and does not output the standby screen SB to the first port P1. The image processing unit GPU can be disposed inside the central processing unit CPU (as shown in FIG. 3) or outside the central processing unit CPU, and there is no specific limitation.

In addition, the receiver device RX can have a second port P2, and the second port P2 can be connected to the display DIS1 through a second channel HDMI2 (such as a HDMI channel). When the receiver device RX triggers the standby screen SB and the receiver device RX is connected to the display DIS1, the receiver device RX will output the standby screen SB to the display DIS1 through the second port P2, but not limited to this.

In other words, when the receiver device RX triggers the standby screen SB and the receiver device RX is respectively connected to the video conference screen management device VM and the display DIS1 through the first channel HDMI1 and the second channel HDMI2, the display DIS1 will receive the standby screen SB from the receiver device RX, but the video conference screen management device VM will not receive the standby screen SB from the receiver device RX, but not limited to this.

Figure 4:
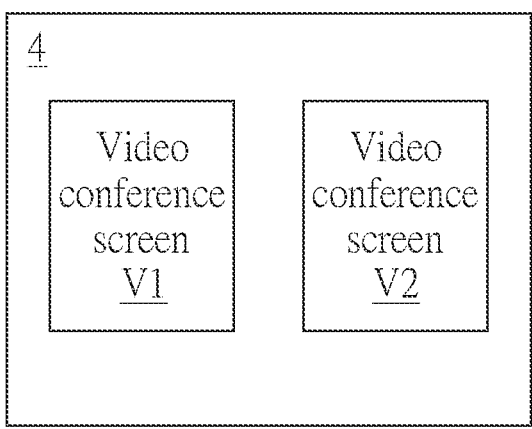
FIG. 4 illustrates a schematic diagram that a video conference system screen is not occupied by a standby screen in the invention.

In this embodiment, the video conference screen management device VM can be connected to a display DIS2 through a third channel HDMI (for example, a HDMI channel). When the video conference screen management device VM receives multiple video conference screens (such as video conference screens V1~V2 in FIG. 4) from different participants, the video conference screen management device VM will distribute these video conference screens to different areas of a video conference system screen 4 displayed on the display DIS2, and these video conference screens do not include the standby screen SB from the receiver device RX. In practical applications, the video conference screen management device VM can be also connected to a camera CAM. The camera CAM is used to obtain video conference screens and provide them to the video conference screen management device VM, but not limited to this.

Figure 5:
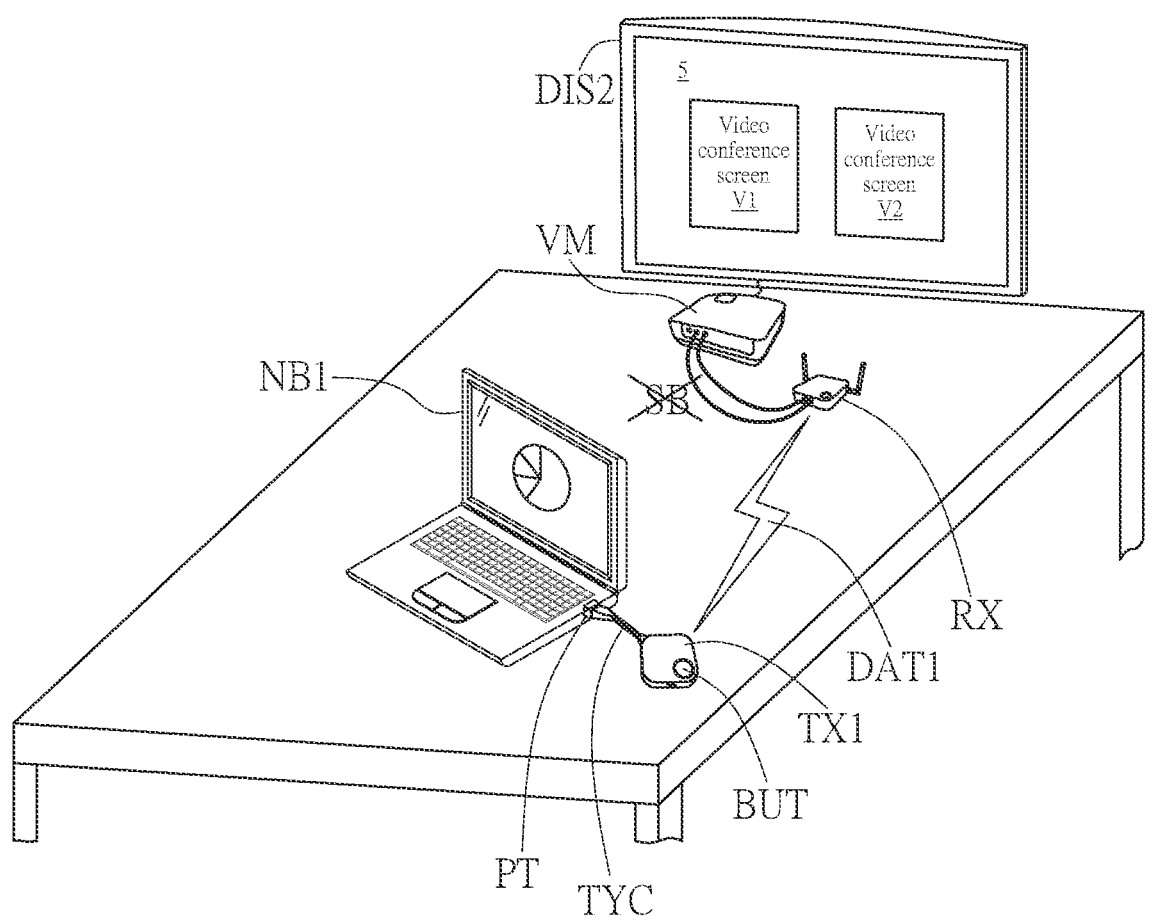
FIG. 5 illustrates a schematic diagram of a video conference system in still another preferred embodiment of the invention.

Please also refer to FIG. 5. As shown in FIG. 5, taking a transmitter device TX1 as an example, the transmitter device TX1 can be connected to a connection port PT of an information processing device NB1 through a connection line TYC (such as the connection line supporting USB, HDMI or USB Type-C alternative mode). A physical button BUT is disposed on the transmitter device TX1. The transmitter device TX1 can start its screen sharing function when the physical button BUT is triggered (for example, the physical button BUT is pressed by the user), so as to wirelessly transmit the video and audio data DAT1 related to the information processing device NB1 (for example, the real-time video conference screen V1 of the information processing device NB1) to the receiver device RX. Then, the receiver device RX transmits the video and audio data DAT1 to the video conference screen management device VM, and the video conference screen management device VM displays the video conference screen V1 of the information processing device NB1 on the video conference system screen 5 of the display DIS2.

When the transmitter device TX1 stops its screen sharing function when the physical button BUT is triggered (for example, the physical button BUT is pressed by the user), the receiver device RX will generate a standby screen SB. At this time, if the receiver device RX is connected to the video conference screen management device VM, the receiver device RX will not output the standby screen SB to the video conference screen management device VM; therefore, the video conference screen management device VM cannot transmit the standby screen SB to the display DIS2, so the standby screen SB cannot be displayed on the video conference system screen 5 of the display DIS2, that is to say, the video conference system screen 5 displayed on the display DIS2 does not include the standby screen SB from the receiver device RX. Therefore, the situation that the standby screen SB occupies a part of the video conference system screen can be effectively avoided. The situations of the other transmitter devices TX2~TX3 can also be deduced in the same way, so it will not be repeated here.

Compared to the prior art, when the video conference system of the invention operates in the scenario of video conference, once the transmitter device stops screen sharing and the receiver device is in the standby state, the receiver device does not output a standby screen to the video conference screen management device and the video conference screen management device cannot display the standby screen on the video conference system screen of the display, so the problem that the standby screen occupies a part of the video conference system screen in the prior art can be effectively solved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video conference system, comprising:
   at least one transmitter device, connected to at least one information processing device; and
   a receiver device, wirelessly connected to the transmitter device, the receiver device wirelessly receiving a video and audio data related to the information processing device transmitted by the transmitter device, when the transmitter device is triggered to stop screen sharing, the receiver device generating a standby screen and when the receiver device is connected to a video conference screen management device, the receiver device does not output the standby screen to the video conference screen management device;
   wherein a physical button is disposed on the transmitter device, the physical button is triggered to wirelessly transmit a real-time screen of the information processing device to the receiver device, and then the receiver device transmits the real-time screen to the video conference screen management device; when the physical button is triggered to stop screen sharing of the transmitter device, the receiver device generates the standby screen; when the video conference screen management device receives a plurality of video conference screens from other devices, the video conference screen management device manages the plurality of video conference screens to distribute the plurality of video conference screens to be displayed on different display areas of a display connected to the video conference screen management device respectively.

2. The video conference system of claim 1, wherein when the transmitter device is not connected to the receiver device, the receiver device outputs the standby screen as a connection operation scenario; if the receiver device is connected to the video conference screen management device, the receiver device does not output the standby screen to the video conference screen management device.

3. The video conference system of claim 1, wherein the receiver device comprises a first port, and the first port is connected to the video conference screen management device through a first channel; the receiver device does not output the standby screen to the video conference screen management device by setting the first port, so that the first channel does not output or close.

4. The video conference system of claim 3, wherein the receiver device comprises an image processing unit coupled to the first port; the image processing unit does not output the standby screen to the first port.

5. The video conference system of claim 1, wherein whether the receiver device is connected to the video conference screen management device is determined through an exchange of extended display identification data (EDID) between the receiver device and the video conference screen management device.

6. The video conference system of claim 1, wherein whether the receiver device is connected to the video conference screen management device is determined through a loopback of universal serial bus (USB) control signal or high-definition multimedia interface (HDMI) consumer electronics control (CEC) signal.

7. The video conference system of claim 1, wherein when the transmitter device does not trigger the screen sharing function or interrupts the connection between the transmitter device and the receiver device and does not wirelessly transmit the screen of the connected information processing device to the receiver device, the receiver device triggers the standby screen.

8. The video conference system of claim 1, wherein when the receiver device triggers the standby screen and the receiver device is connected to a first display, the receiver device outputs the standby screen to the first display.

9. The video conference system of claim 1, wherein the receiver device has a second port, the second port is connected to the first display through a second channel, the first display receives the standby screen, but the video conference screen management device does not receive the standby screen.

10. The video conference system of claim 1, wherein the plurality of video conference screens does not include the standby screen transmitted from the receiver device.

11. The video conference system of claim 1, wherein the video conference screen management device is connected to the display through a HDMI channel.

12. The video conference system of claim 1, wherein the video conference screen management device is also connected to a camera, and the camera obtains a video conference screen and provides the video conference screen to the video conference screen management device.

13. A video conference system, comprising:

at least one transmitter device, connected to at least one information processing device; and a receiver device, wirelessly connected to the transmitter device, the receiver device wirelessly receiving a video and audio data related to the information processing device transmitted by the transmitter device, when the receiver device triggers a standby screen and the receiver device is connected to a video conference screen management device, the receiver device does not output the standby screen to the video conference screen management device;

wherein a physical button is disposed on the transmitter device, the physical button is triggered to wirelessly transmit a real-time screen of the information processing device to the receiver device, and then the receiver device transmits the real-time screen to the video conference screen management device; when the physical button is triggered to stop screen sharing of the transmitter device, the receiver device generates the standby screen; when the video conference screen management device receives a plurality of video conference screens from other devices, the video conference screen management device manages the plurality of video conference screens to distribute the plurality of video conference screens to be displayed on different display areas of a display connected to the video conference screen management device respectively.

* * * * *